(12) United States Patent
Morimoto et al.

(10) Patent No.: US 7,998,261 B2
(45) Date of Patent: Aug. 16, 2011

(54) EXHAUST GAS PURIFYING APPARATUS

(75) Inventors: Youhei Morimoto, Kariya (JP);
Tsukasa Kuboshima, Okazaki (JP);
Shigeto Yahata, Obu (JP)

(73) Assignee: Denso Corporation, Kariya (JP)

( * ) Notice: Subject to any disclaimer, the term of this patent is extended or adjusted under 35 U.S.C. 154(b) by 825 days.

(21) Appl. No.: 11/598,769

(22) Filed: Nov. 14, 2006

(65) Prior Publication Data
US 2007/0107390 A1  May 17, 2007

(30) Foreign Application Priority Data

Nov. 14, 2005  (JP) ................................. 2005-328884

(51) Int. Cl.
*B01D 49/00*  (2006.01)
(52) U.S. Cl. ................ 96/400; 96/397; 96/399; 60/295; 60/272
(58) Field of Classification Search .................... 96/400, 96/397, 399; 60/295, 272
See application file for complete search history.

(56) References Cited

U.S. PATENT DOCUMENTS

| 6,829,889 B2 | 12/2004 | Saito et al. | |
|---|---|---|---|
| 6,966,178 B2 | 11/2005 | Saito et al. | |
| 2004/0172933 A1* | 9/2004 | Saito et al. | 60/277 |

FOREIGN PATENT DOCUMENTS

| DE | 101 44 958 A1 | 3/2003 |
|---|---|---|
| DE | 10 2004 005 321 A1 | 8/2005 |

OTHER PUBLICATIONS

Office Action dated Dec. 10, 2009 issued in corresponding German Application No. 10 2006 035 430.3-13 with an at least partial English-language translation thereof.
A. G. Konstandopoulos et al., "Fundamental Studies of Diesel Particulate Filters: Transient Loading, Regeneration and Aging", Society of Automotive Engineers, Inc., 2000, SAE 2000-01-1016, pp. 593-614.

* cited by examiner

*Primary Examiner* — Jason M Greene
*Assistant Examiner* — Anthony Shumate
(74) *Attorney, Agent, or Firm* — Nixon & Vanderhye P.C.

(57) ABSTRACT

An exhaust gas purifying apparatus for an internal combustion engine includes a collector, a differential pressure sensing device, a differential pressure based estimating device, a partition wall exposure sensing device, and a second regenerating device. The collector captures exhaust particles in exhaust gas. The differential pressure sensing device senses a differential pressure across the collector. The differential pressure based estimating device estimates an accumulation amount of the exhaust particles based on the differential pressure. The partition wall exposure sensing device senses a partition wall exposure state. The second regenerating device forcibly completely combusts the exhaust particles captured in the collector when the partition wall exposure sensing device senses the partition wall exposure state.

7 Claims, 8 Drawing Sheets

EXPOSURE OF PARTITION WALL

EXPOSURE OF PARTITION WALL

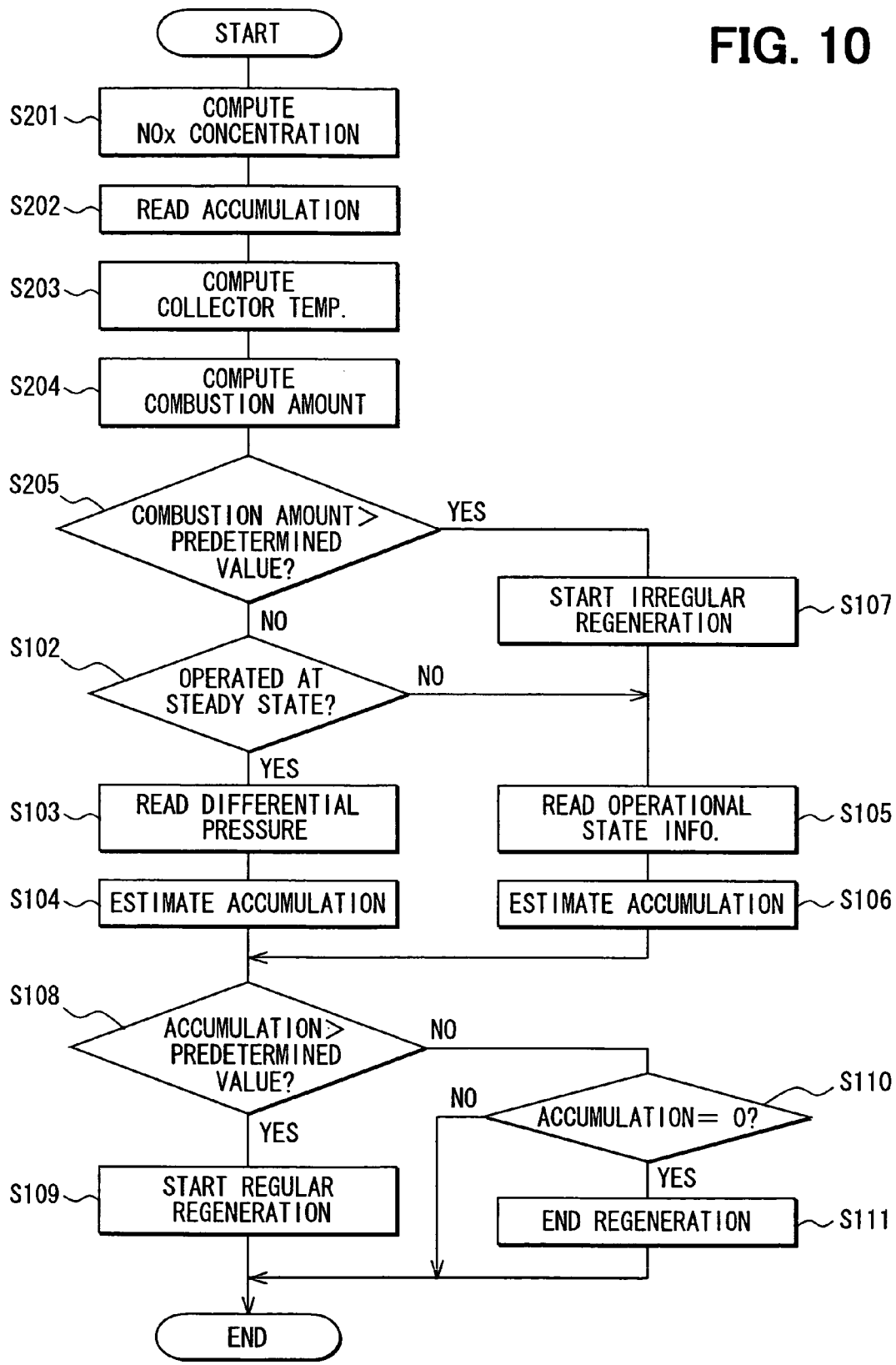

US 7,998,261 B2

EXHAUST GAS PURIFYING APPARATUS

CROSS REFERENCE TO RELATED APPLICATION

This application is based on and incorporates herein by reference Japanese Patent Application No. 2005-328884 filed on Nov. 14, 2005.

BACKGROUND OF THE INVENTION

1. Field of the Invention

The present invention relates to an exhaust gas purifying apparatus for an internal combustion engine, the exhaust gas purifying apparatus capturing exhaust particles in exhaust gas.

2. Description of Related Art

Recently, in a compression ignition diesel engine (internal combustion engine) system using light oil, exhaust particles in exhaust gas are captured by a collector provided in an exhaust passage (exhaust system). The collector includes porous partition walls, and the exhaust particles are captured when the exhaust gas flows through the partition walls.

When an accumulation amount of the exhaust particles captured in the collector becomes excessively large, a back pressure of the internal combustion engine is increased due to a resistance for communication in the collector. Thus, a temperature of the collector is increased at proper timing to burn (combusts) the captured exhaust particles. Therefore the collector is regenerated. In this case, if the collector is regenerated in a state where the exhaust particles are excessively captured (accumulated), the temperature of the collector may become very high (e.g., 1500° C.) because the exhaust particles are rapidly burned. As a result, the collector may be broken.

In Japanese Unexamined Patent Publication No. 2004-286019 corresponding to U.S. Pat. No. 6,966,178, the accumulation amount of the exhaust particles is estimated based on a differential pressure across the collector by using an accumulation characteristic. Then, the collector is regenerated when an estimated value of the estimated accumulation amount exceeds a predetermined value. Here, the accumulation characteristic defines a relation between the accumulation amount of the exhaust particles and the differential pressure.

However, in an apparatus disclosed in Japanese Unexamined Patent Publication No. 2004-286019, the accumulation amount may be disadvantageously underestimated under a certain condition in a state where the accumulated exhaust particles are burned so that the accumulation amount is decreased. In the disclosed apparatus, the accumulated amount is estimated based on the accumulation characteristic. If the accumulation amount is once underestimated, the exhaust particles may be accumulated excessively by a time where the estimated value of the exhaust particles increases to reach the predetermined value. Thus, when the collector is regenerated, the exhaust particles are excessively rapidly burned so that the collector may disadvantageously be broken.

SUMMARY OF THE INVENTION

The present invention is made in view of the above disadvantages. Thus, it is an objective of the present invention to address at least one of the above disadvantages.

To achieve the objective of the present invention, there is provided an exhaust gas purifying apparatus for an internal combustion engine, which includes an exhaust system for exhaust gas from the internal combustion engine, the exhaust gas purifying apparatus including a collector, a regeneration determining device, a first regenerating device, a differential pressure sensing device, a differential pressure based estimating device, a partition wall exposure sensing device, and a second regenerating device. The collector is provided in the exhaust system of the internal combustion engine and includes a porous partition wall for capturing exhaust particles in the exhaust gas when the exhaust gas passes through the partition wall. The regeneration determining device determines that the exhaust particles captured in the collector need to be forcibly combusted to regenerate the collector in a regular manner when an accumulation amount of the exhaust particles captured in the collector exceeds a predetermined value. The first regenerating device forcibly combusts the exhaust particles captured in the collector to regenerate the collector in the regular manner when the regeneration determining device determines that the exhaust particles captured in the collector need to be forcibly combusted. The differential pressure sensing device senses a differential pressure across the collector. The differential pressure based estimating device estimates the accumulation amount of the exhaust particles based on the differential pressure across the collector using an accumulation characteristic map that defines a relation between the accumulation amount and the differential pressure. The partition wall exposure sensing device senses a partition wall exposure state, where a part of a surface of the partition wall on an exhaust gas inflow side is exposed by combusting the exhaust particles captured in the collector after the surface of the partition wall is covered by the exhaust particles captured in the collector. The second regenerating device forcibly completely combusts the exhaust particles captured in the collector when the partition wall exposure sensing device senses the partition wall exposure state.

To achieve the objective of the present invention, there is also provided an exhaust gas purifying apparatus for an internal combustion engine, which includes an exhaust system for exhaust gas from the internal combustion engine, the exhaust gas purifying apparatus including a collector, a regeneration determining device, a regenerating device, a differential pressure sensing device, a differential pressure based estimating device, and a partition wall exposure sensing device. The collector is provided in the exhaust system of the internal combustion engine and includes a porous partition wall for capturing exhaust particles in the exhaust gas when the exhaust gas passes through the partition wall. The regeneration determining device determines that the exhaust particles captured in the collector need to be forcibly combusted to regenerate the collector in a regular manner when an accumulation amount of the exhaust particles captured in the collector exceeds a predetermined value. The regenerating device forcibly combusts the exhaust particles captured in the collector to regenerate the collector in the regular manner when the regeneration determining device determines that the exhaust particles captured in the collector need to be forcibly combusted. The differential pressure sensing device senses a differential pressure across the collector. The differential pressure based estimating device estimates the accumulation amount of the exhaust particles based on the differential pressure across the collector using an accumulation characteristic map that defines a relation between the accumulation amount and the differential pressure. The partition wall exposure sensing device senses a partition wall exposure state, where a part of a surface of the partition wall on an exhaust gas inflow side is exposed by combusting the exhaust particles captured in the collector after the surface of the partition wall is covered by the exhaust particles captured in the collector.

BRIEF DESCRIPTION OF THE DRAWINGS

The invention, together with additional objectives, features and advantages thereof, will be best understood from the following description, the appended claims and the accompanying drawings in which:

FIG. 10 is a flow chart showing a regeneration control process of the collector executed by the ECU in an exhaust gas purifying apparatus according to a second embodiment of the present invention;

DETAILED DESCRIPTION OF PREFERRED EMBODIMENTS

First Embodiment

A first embodiment of the present invention will be described with accompanying drawings.

Figure 1:
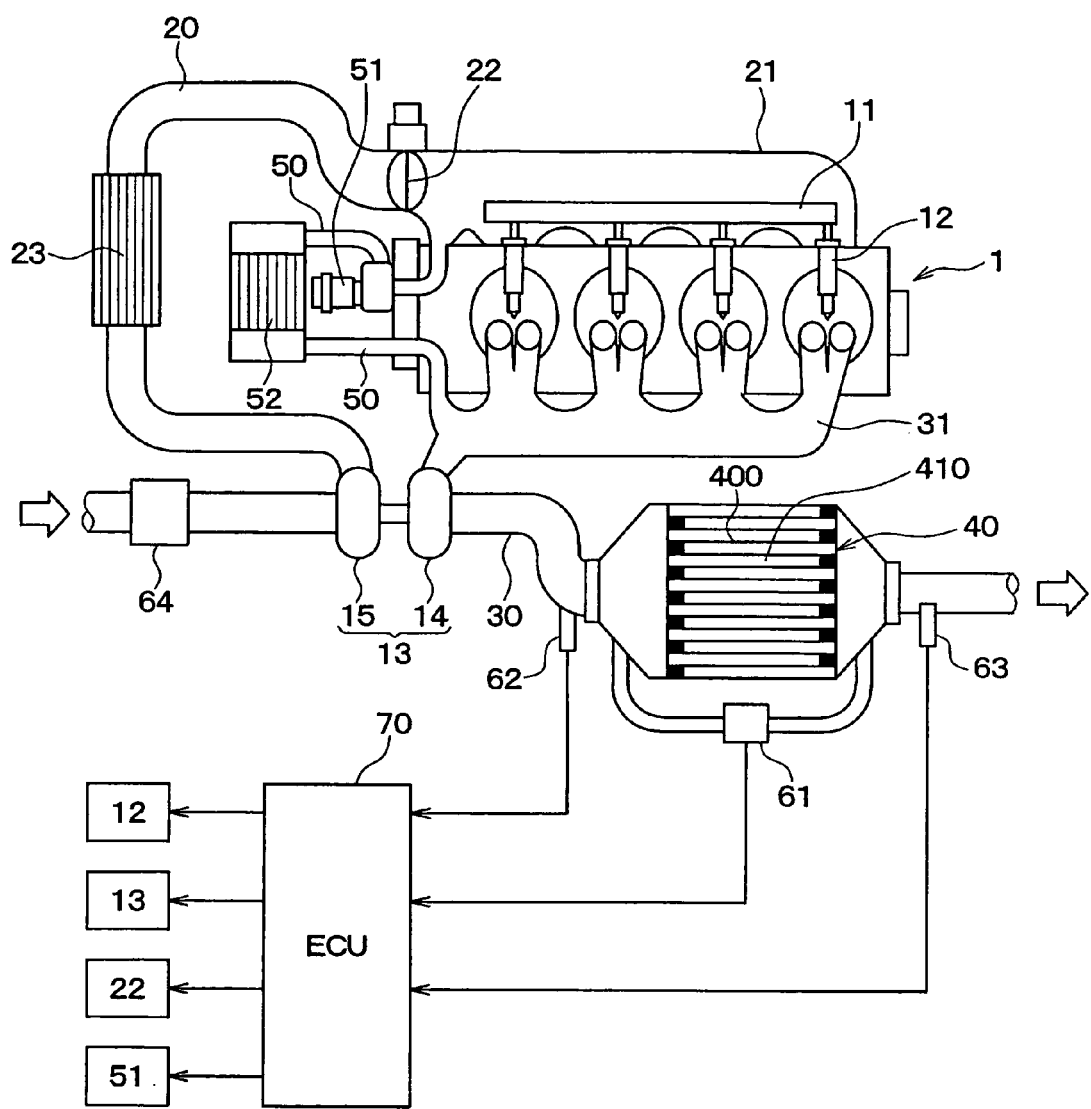
FIG. 1 is a schematic diagram of an internal combustion engine having an exhaust gas purifying apparatus according to a first embodiment of the present invention.

An internal combustion engine 1 shown in FIG. 1 is a water-cooled diesel internal combustion engine mounted on a vehicle to drive the vehicle. The internal combustion engine 1 includes a common rail 11 and multiple fuel injection valves 12. The common rail 11 accumulates high pressure fuel, and the fuel injection valves 12 are connected to the common rail 11 to inject the fuel into cylinders of the internal combustion engine 1. The internal combustion engine 1 drives a pump (not shown) to compress fuel and to pump the high-pressure fuel into the common rail 11.

The internal combustion engine 1 includes an intake manifold 21, which is connected to an intake pipe 20. An intake throttle 22 is provided to the connection between the intake manifold 21 and the intake pipe 20. The intake throttle 22 is used for adjusting a passage area of the intake system so that an intake flow rate is adjusted.

The internal combustion engine 1 includes an exhaust manifold 31, which is connected to an exhaust pipe (exhaust system) 30. In a middle of the exhaust pipe 30, a collector 40 is provided for capturing exhaust particles (PM) in exhaust gas.

Figure 2:
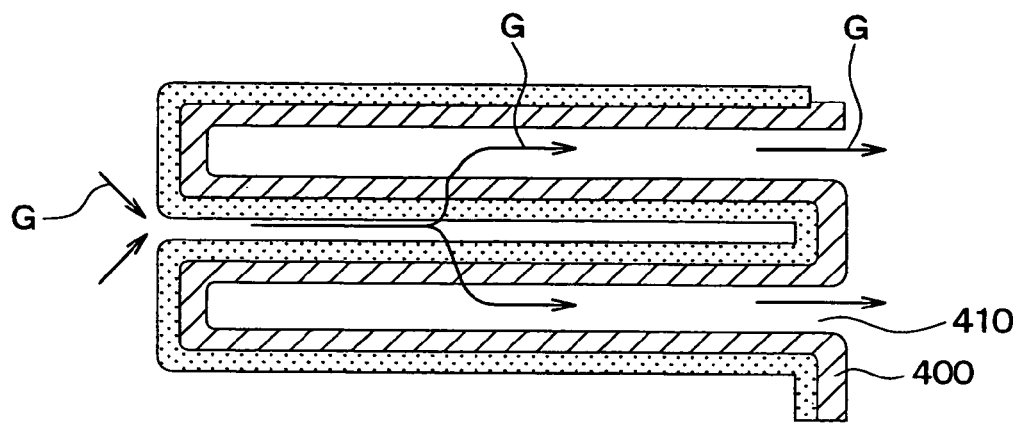
FIG. 2 is a diagram showing a main portion of a collector shown in FIG. 1.

As shown in FIG. 2, the collector 40 is formed as a honeycomb structure using heat-resistance ceramics (e.g., cordierite). The honeycomb structure has multiple exhaust passages 410 defined by porous partition walls 400. Entrances and exits of the exhaust passages 410 are alternately closed such that the exhaust passages 410 has a checker flag pattern observed from either an entrance side or an exit side thereof. An oxidation catalyst is held by the porous partition wall 400. The exhaust gas G supplied from the internal combustion engine 1 enters into each of the exhaust passages 410 to flow into an adjacent exhaust passage 410 by passing through the porous partition wall 400. Thus, the PM is captured when the exhaust gas G passes through the porous partition wall 400.

A turbine 14 of a centrifugal supercharger 13 is provided upstream of the collector 40 in the exhaust pipe 30. The turbine 14 is connected with a compressor 15, which is provided in the intake pipe 20, through a turbine shaft. Therefore, the turbine 14 is driven by thermal energy of the exhaust gas such that the compressor 15 is driven through the turbine shaft. As a result, intake air introduced into the intake pipe 20 can be compressed in the compressor 15. Supercharging pressure can be adjusted when inclination of a nozzle (not shown) of the centrifugal supercharger 13 is changed. Here, the nozzle is provided on a compressor 15 side of the centrifugal supercharger 13.

A intercooler 23 is provided downstream of the compressor 15 and upstream of the intake throttle 22 in the intake pipe 20. The intake air, which is compressed in the compressor 15 to have a high temperature, is cooled in the intercooler 23.

The exhaust manifold 31 is connected to the intake manifold 21 through an exhaust gas recirculation (EGR) passage 50 such that a part of the exhaust gas is returned to the intake system. An EGR valve 51 is provided at a connection between the EGR passage 50 and the intake manifold 21. The EGR valve 51 is used for adjusting an passage area of the EGR passage 50 such that an amount of the exhaust gas, which is returned to the intake system, can be adjusted. Also, an EGR cooler 52 is provided in a middle of the EGR passage 50 for cooling the returned exhaust gas.

A differential pressure sensor 61 is provided in the exhaust pipe 30. The differential pressure sensor 61 outputs an electrical signal in relation to a differential pressure across the collector 40 and serves as a differential pressure sensing device. The differential pressure sensor 61 is connected to the exhaust pipe 30 at one end upstream of the collector 40. Also, the differential pressure sensor 61 is connected to the exhaust pipe 30 at another end downstream of the collector 40.

A first exhaust gas temperature sensor 62 is provided upstream of the collector 40 for outputting an electrical signal in relation to a temperature of the exhaust gas, which flows into the collector 40. A second exhaust gas temperature sensor 63 is provided downstream of the collector 40 for outputting an electrical signal in relation to a temperature of the exhaust gas, which outflows from the collector 40.

An air flow meter 64 is provided upstream of the compressor 15 in the intake pipe 20 for sensing the intake flow rate.

The ECU 70 includes a known microcomputer, which has a CPU, a ROM, an EEPROM, and a RAM, and executes various programs stored in the microcomputer. The CPU, the ROM, the EEPROM, and the RAM are not illustrated. The ECU 70 receives signals supplied from the differential pressure sensor 61, the first exhaust gas temperature sensor 62, the second exhaust gas temperature sensor 63, and the air flow meter 64. Also, the ECU 70 receives signals supplied from various sensors (not shown), which sense an opening of the intake throttle valve 22, a valve opening of the EGR valve 51, a rotational speed of the internal combustion engine 1, a vehicle speed, a coolant temperature, a crank position, a fuel pressure, etc. Then, ECU 70 controls the fuel injection valves 12, the centrifugal supercharger 13, the intake throttle 22, the EGR valve 51, etc based on computation results.

Figure 3:
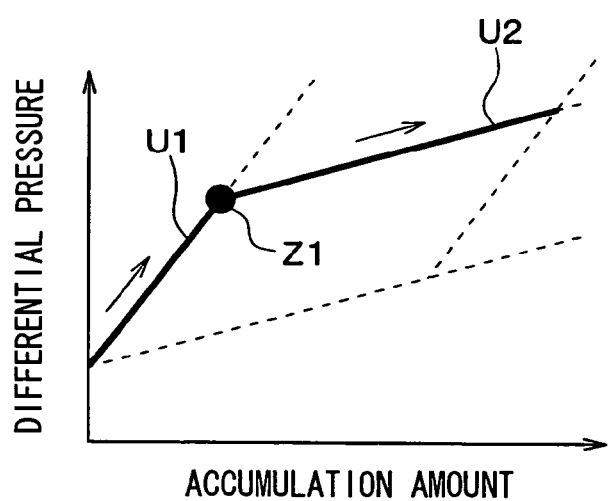
FIG. 3 is a chart showing a relation between a differential pressure across the collector and an accumulation amount of exhaust particles when the exhaust particles are accumulated.

Next, a relation between an accumulation amount of the PM accumulated in the collector 40 and the differential pressure across the collector 40 will be described. FIG. 3 is a chart showing a relation between the differential pressure and the accumulation amount of the PM under a constant (steady) engine operational condition when the PM starts being accumulated in an initial state of the collector 40. As shown in FIG. 3, the differential pressure increases as the accumulation amount of the PM increases. Here, the initial state of the collector 40 indicates either a brand-new collector 40, on which no PM is accumulated, or the regenerated collector 40 immediately after a complete regeneration (i.e., there is no accumulation of the PM).

An increase characteristic of the accumulation amount of the PM when the accumulation amount increases is indicated by a characteristic line of two characteristic inclinations (i.e., the increase characteristic is indicated by two characteristic lines of discontinuous characteristic inclinations). That is, an inclination of the characteristic line changes from one characteristic inclination to another at a point (increase transition point) Z1, at which the accumulation amount becomes a first accumulation amount. A segment of the characteristic line, which ranges from an initial point to the increase transition point Z1, is a first increase characteristic line U1. In other words, in the first increase characteristic line (first increase map segment) U1, the accumulation amount of the PM ranges from zero as an initial amount at the initial point to the first accumulation amount at the increase transition point Z1. Also, another segment of the characteristic line, which exceeds the increase transition point Z1, is a second increase characteristic line U2. In other words, in the second increase characteristic line (second increase map segment) U2, the accumulation amount exceeds the first accumulation amount at the increase transition point Z1.

As clearly shown in FIG. 3, an increase of the differential pressure relative to an increase of the accumulation amount of the PM in the second increase characteristic line U2 is smaller than that in the first increase characteristic line U1. This will be described with reference to FIGS. 4A, 4B.

Figure 4A:
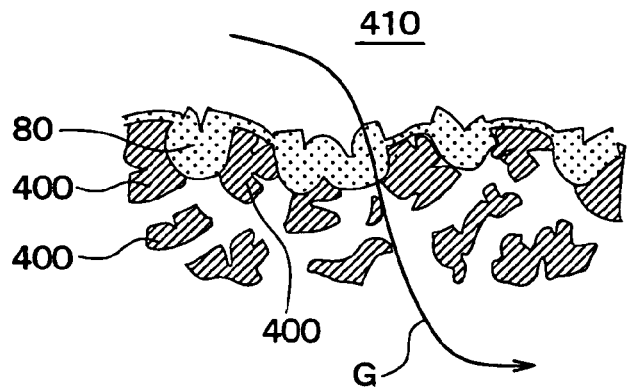
FIG. 4A is a diagram showing a process of accumulation of the exhaust particles in the collector shown in FIG. 1.
Figure 4B:
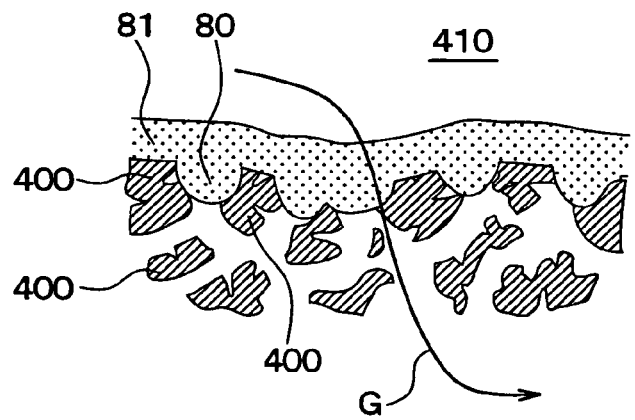
FIG. 4B is a diagram showing another process of the accumulation of the exhaust particles in the collector shown in FIG. 1.

FIGS. 4A, 4B show processes of the accumulation of the PM at the partition wall 400 of the collector 40. In a first operational state, where the accumulation amount ranges from zero at the initial point to the first accumulation amount at the increase transition point Z1, PM 80 enters into pores of the partition wall 400 to clog the pores as shown in FIG. 4A. As a result, the differential pressure rapidly increases as the accumulation amount increases.

In a second operational state, where most pores have been clogged (i.e., the accumulation amount of the PM exceeds the first accumulation amount at the increase transition point Z1), PM 81 accumulates in a luminary manner on a surface of the partition wall 400 on an exhaust gas inflow side. In the second operational state, the differential pressure more slowly increases with the increase of the accumulation amount of the PM than that in the first operational state.

Figure 5:
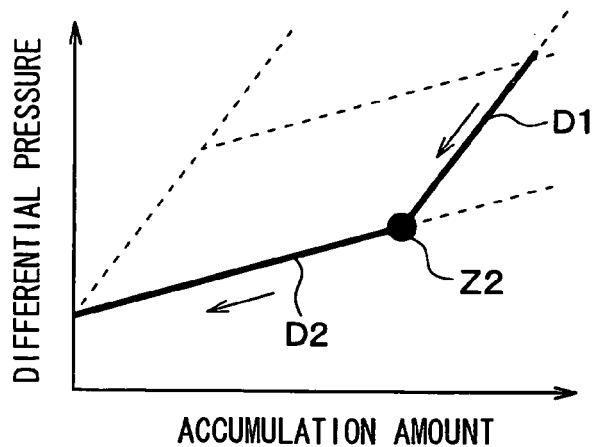
FIG. 5 is a chart showing another relation between the differential pressure across the collector and the accumulation amount of the exhaust particles when the accumulation amount of the exhaust particles decreases.

FIG. 5 is another chart showing a relation between the differential pressure and the accumulation amount of the exhaust particles under a constant (steady) engine operational state when the accumulation amount of the PM decreases. In this case, the accumulation amount of the PM decreases due to the combustion of the PM after the PM has accumulated to a certain degree. As shown in FIG. 5, the differential pressure decreases as the accumulation amount of the PM decreases.

A decrease characteristic of the accumulation amount of the PM when the accumulation amount decreases is indicated by a decrease characteristic line of two characteristic inclinations (i.e., the decrease characteristic is indicated by two characteristic lines of discontinuous characteristic inclinations). That is, an inclination of the decrease characteristic line changes from one characteristic inclination to another at a point (decrease transition point) Z2, at which the accumulation amount becomes a second accumulation amount. A segment of the decrease characteristic line, which ranges from a cross point for crossing the second increase characteristic line U2 to the decrease transition point Z2, is a first decrease characteristic line D1. In other words, in the first decrease characteristic line (first decrease map segment) D1, the accumulation amount of the PM ranges from a certain amount at the cross point between the first decrease characteristic line D1 and the second increase characteristic line U2 to the second accumulation amount at the decrease transition point Z2. Also, another segment of the decrease characteristic line, which goes from the decrease transition point Z2 to the initial point as the accumulation amount of the PM decreases, is a second decrease characteristic line D2. In other words, in the second decrease characteristic line (second decrease map segment) D2, the accumulation amount of the PM ranges from the second accumulation amount at the decrease transition point Z2 to zero at the initial point as the accumulation amount of the PM decreases.

As clearly shown in FIG. 5, a decrease of the differential pressure relative to a decrease of the accumulation amount of the PM in the second decrease characteristic line D2 is smaller than that in the first decrease characteristic line D1. This will be described with reference to FIGS. 6A, 6B.

Figure 6A:
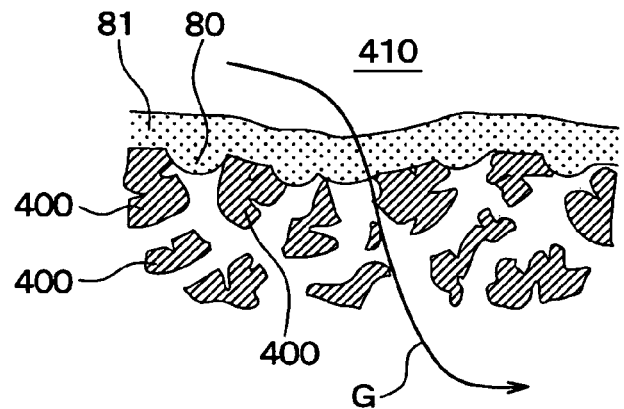
FIG. 6A is a process of combustion and removal of the exhaust particles accumulated in the collector shown in FIG. 1.
Figure 6B:
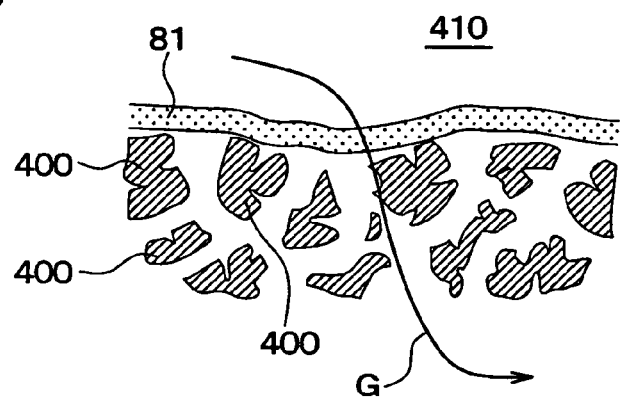
FIG. 6B is another process of the combustion and the removal of the exhaust particles accumulated in the collector shown in FIG. 1.

FIGS. 6A, 6B show processes of the combustion and removal of the PM accumulated on the partition wall 400 of the collector 40. In a third operational state, where the accumulation amount of the PM ranges from an certain amount at the cross point between the first decrease characteristic line D1 and the second increase characteristic line U2 to the second accumulation amount at the decrease transition point Z2, the PM 80 (FIG. 6A) clogged in the pores of the partition wall 400 is burned and removed. As a result, the differential pressure quickly decreases as the accumulation amount of the PM decreases.

Also after the PM in the pores has been burned (i.e., in a fourth operational state where the accumulation amount of the PM is decreased from the second accumulation amount at the decrease transition point Z2 to reach to zero at the initial point), the PM 81 (FIG. 6B) accumulated (layered) on the surface of the partition wall 400 is burned and removed. In the above fourth operational state, the differential pressure more slowly decreases with the decrease of the accumulation amount of the PM than that in the third operational state.

Figure 7:
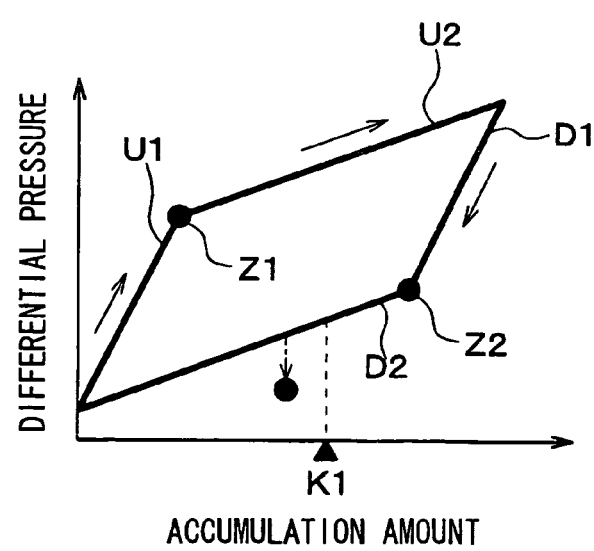
FIG. 7 is a chart showing the relation between the differential pressure across the collector and the accumulation amount of the exhaust particles.

FIG. 7 is a chart showing a combined characteristic of the accumulation in a PM increasing state (first and second operational state) and in a PM decreasing state (third and fourth operational state). Here, the first increase characteristic line U1 corresponds to a process where the PM clogs the pores. The first decrease characteristic line D1 corresponds to a process where the PM clogged in the pores is removed. Because characteristics of both characteristic lines are based on change of the accumulated PM on the pores, inclinations of the characteristic lines are substantially similar to each other. As a result, the inclination of the first increase line U1 is parallel to that of the first decrease line D1.

Also, the second increase characteristic line U2 corresponds to a process where the layer of the PM accumulated on the surface of the partition wall 400 increases in thickness after the pores have been clogged. The second decrease characteristic line D2 corresponds to a process where the layer of the PM accumulated on the surface of the partition wall 400 decreases in thickness after the PM in the pores have been fully burned. Because characteristics of both characteristic lines are based on the change of the accumulated layer of the PM, inclinations of the two characteristic lines are substantially similar to each other. As a result, the inclination of the second increase line U2 is parallel to that of the second decrease line D2.

Figure 8:
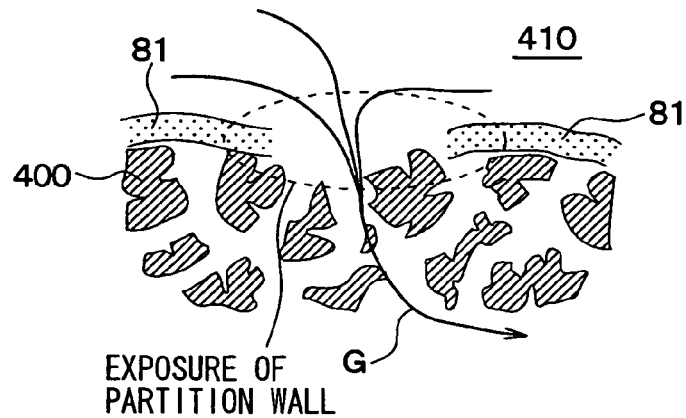
FIG. 8 is a diagram showing an exposed partition wall of the collector shown in FIG. 1.

However, in practice, in a middle of the process (fourth operational state) where the accumulation amount of the PM decreases from the second accumulation amount at the decrease transition point Z2 to zero at the initial point, a part of the partition wall 400 is exposed as shown in FIG. 8. This exposure is caused by burning (combustion of) the PM 81 accumulated (layered) on the surface of the partition wall 400. As a result, a pressure loss at a position, where the surface of the partition wall 400 is exposed, becomes smaller. Thus, when the part of the surface of the partition wall 400 is exposed, the differential pressure quickly decreases as a chain line shown in FIG. 7.

Here, a map of the accumulation characteristic, which includes the first and second increase characteristic lines U1, U2, and the first and second decrease characteristic lines D1, D2, is stored in the ROM of the ECU 70. The accumulation characteristic can be computed beforehand in experiments.

Then, operations of the exhaust gas purifying apparatus according to the present embodiment will be described. In the present embodiment, the accumulated amount of the PM accumulated in the collector 40 is estimated by using (changing) a differential pressure based method and an operational history based method depending on an operational state of the internal combustion engine 1. Here, in the differential pressure based method, the accumulation amount is computed based on the differential pressure across the collector 40 sensed by the differential pressure sensor 61. Also, in the operational history based method, the accumulation amount is computed based on an inflow rate of the PM into the collector 40 (i.e., discharge rate of the PM) from the internal combustion engine 1 and a combustion rate of the PM in the collector 40. The inflow rate of the PM into the collector 40 can be computed based on an operational state information of the engine 1, such as the rotation speed of the engine 1, the fuel injection quantity. Also, the combustion rate of the PM in the collector 40 can be computed based on the temperature of the collector 40.

Figure 9:
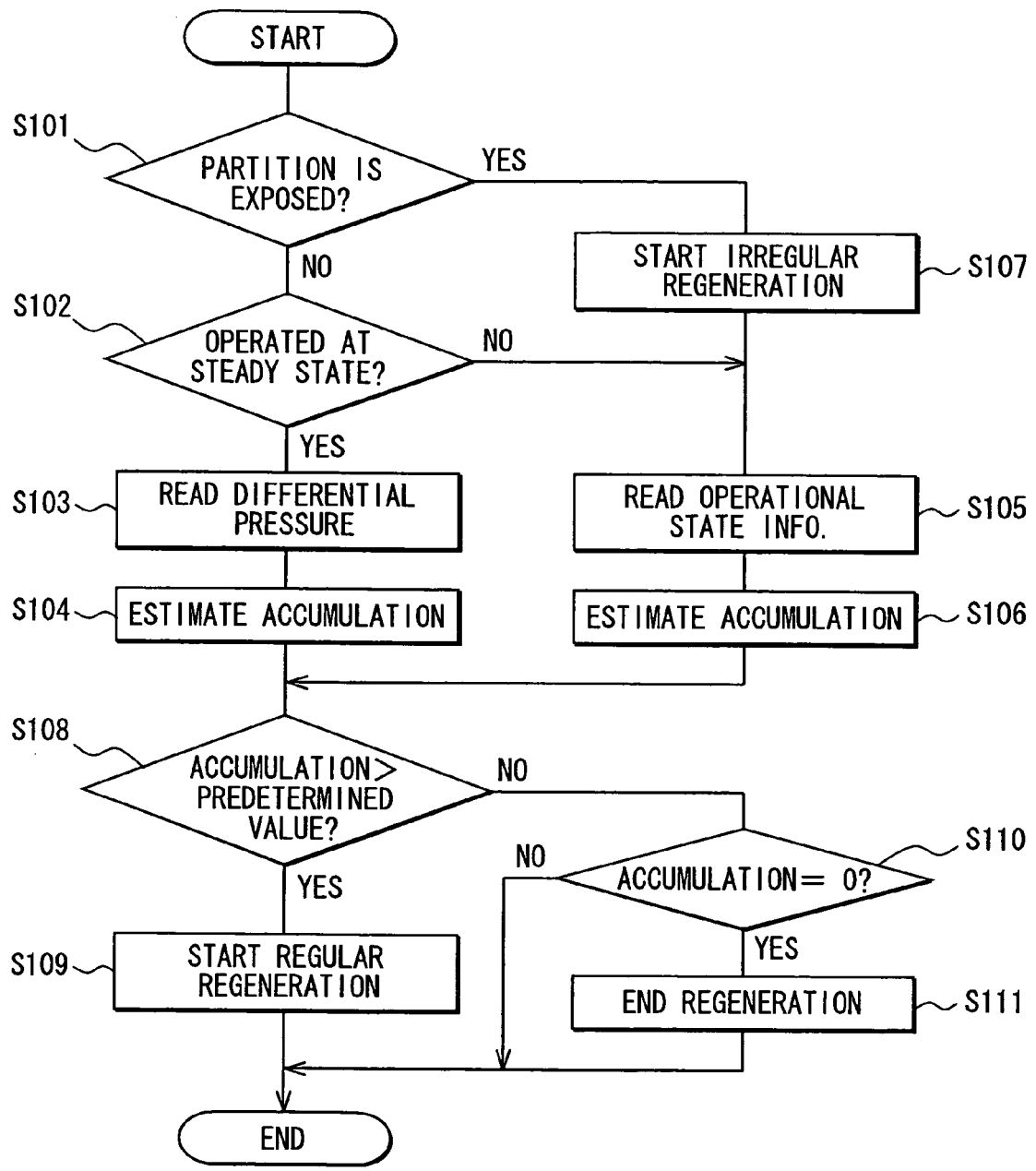
FIG. 9 is a flow chart showing a regeneration control process of the collector executed by an electronic control unit (ECU) shown in FIG. 1.

FIG. 9 is a flow chart showing a collector regeneration control process executed by the ECU 70. This control process is started when the ECU 70 is turned on using a key switch, and is repeated at predetermined intervals.

As shown in FIG. 9, at step S101, which serves as a partition wall exposure sensing device, it is determined whether a part of a surface of the partition wall 400 is exposed or not (i.e., a partition wall exposure state is sensed). Specifically, in the process where the accumulation amount of the PM ranges from the second accumulation amount at the decrease transition point Z2 to zero at the initial point, it is determined that the part of the surface of the partition wall 400 is exposed (YES at step S101) when a computed accumulation amount of the PM is equal to or less than a predetermined accumulation value K1 (see FIG. 7). Here, the computed accumulation amount of the PM is computed at step S104 or step S106 as described later. The computed accumulation amount of the PM at step S104 or step S106 is stored in the EEPROM of the ECU 70. Also, it is determined that the part of the surface of the partition wall 400 is exposed (YES at step S101) when a flag set at step S107 for indicating an irregular regeneration, where the collector 40 is regenerated during the partition wall exposure state.

When the part of the surface of the partition wall 400 is not exposed (NO at step S101), it is determined at step S102 whether the internal combustion engine 1 is operated under a steady operational condition, in order to select an estimation method for estimating the accumulation amount of the PM.

When the internal combustion engine 1 is operated under the steady operational condition (YES at step S102), the accumulation amount of the PM is estimated by using the differential pressure based method at step S103 and step S104. Step S104 corresponds to differential pressure based estimating device of the present invention. Also in step S102, when a change of the flow rate of the exhaust gas per unit time and a change of the differential pressure per unit time are both small, the internal combustion engine 1 is determined to be operated under the steady operational condition.

In contrast, when the internal combustion engine 1 is operated under a transient operational condition (NO at step S102), the accumulation amount is estimated by using the operational history based method at step S105 and step S106. Step S106 corresponds to an operational history based estimating device of the present invention. When the part of the surface of the partition wall 400 is exposed during the process where the accumulation amount ranges from the second accumulation amount to zero (YES at step S101), the accumulation amount is also estimated by using the operational history based method at step S105 and step S106 after step S107 is executed.

In a case of estimating the accumulation amount by using the differential pressure based method, the differential pressure across the collector 40 sensed by the differential pressure sensor 61 is read at step S103. Then, at step S104, the accumulation amount of the PM is estimated based on the differential pressure read at step S103 by using the accumulation characteristic map stored in the ROM of the ECU 70.

In contrast, in a case of estimating the accumulation amount using the operational history based method, the ECU 70 reads signals from the first and second exhaust gas temperature sensors 62, 63. Also, the ECU 70 reads the accumulation amount of the PM, the rotation speed of the engine 1, and the fuel injection quantity, all of which indicate preceding sensed (computed) values and are stored in the EEPROM of the ECU 70. Then, at step S106, the accumulation amount of the PM is computed using a known method based on the information read at step S105.

Control continues with step S108, which serves as a regeneration determining device, after step S104 or step S106. At step S108, it is determined whether the PM in the collector 40 is forcibly burned to regenerate the collector 40 or not. In order to make the above determination, it is determined whether the computed accumulation amount of the PM computed at step S104 or step S106 exceeds a predetermined value or not. When the computed accumulation amount of the PM at step S104 or step S106 is equal to or less than the predetermined value, it is determined at step S110 whether the accumulated amount of the PM is equal to zero, in order to determine whether the regeneration of the collector 40 is completed.

When the accumulated amount of the PM is equal to or less than the predetermined value (NO at step S108) but is not equal to zero (NO at step S110), the control process ends. This control process is repeated at the predetermined intervals.

When the accumulation amount increases due to the continued operation of the engine 1, thereby the computed accumulation amount of the PM computed at step S104 or step S106 exceeding the predetermined value, it is affirmatively determined at step S108 (YES at step S108). Then, at step S109 (corresponding to a first regenerating device, regenerating device), the collector 40 is regenerated in a regular (normal) manner by a known method (i.e., a regular regeneration of the collector 40 is performed.

When the regular regeneration is started and the accumulation amount of the PM decreases, it will be later determined negatively at step S108 (NO at step S108) in a following execution of the control process. Thus, control continues with step S110. When it is determined at step S110 that the computed accumulation amount of the PM is not equal to zero (NO at step S110), the regular regeneration of the collector 40 continues. When it is determined at step S110 that the computed accumulation amount of the PM is equal to zero (YES at step S110) in a following execution of the control process, the regular regeneration is ended at step S111.

When the determination at step S101 is YES (i.e., the part of the surface of the partition wall 400 is exposed during the process where the accumulation amount ranges from the second accumulation amount at the decrease transition point Z2 to zero at the initial point), control continues with step S107. At step S107, which serves as a second regeneration device, a predetermined procedure (e.g., a post injection or injection timing retardation) is performed such that an irregular regeneration of the collector 40 (i.e., a regeneration of the collector 40 during the partition wall exposure state) is started.

In the operational state where the determination at step S101 is YES, the accumulation amount of the PM is likely to be underestimated when the differential pressure based method is used for estimating the accumulation amount. This is because the differential pressure rapidly decreases as the chain line shown in FIG. 7. In the above case, the accumulation amount is estimated by using the operational history based method at step S105 and step S106.

When the irregular regeneration is started and the accumulation amount of the PM decreases, it will be determined negatively at step S108 (NO at step S108) in a following execution of the control process. Thus, control continues with step S110. When the computed accumulation amount of the PM computed by using the operational history based method becomes equal to zero, it is determined that the regeneration is completed (YES at step S110). Then, control continues with step S111. At step S111, the irregular regeneration is ended and the flag for indicating that the irregular regeneration is being performed is reset.

At a time where the collector 40 is completely regenerated by performing the irregular regeneration, the current relation between the accumulation amount of the PM and the differential pressure corresponds to the relation defined in the map of the accumulation characteristic stored in the ROM of the ECU 70.

Therefore, the accumulation amount of the PM is accurately estimated instead of being underestimated due to the exposure of the partition wall 400. Thus, the collector 40 is limited from being broken due to the above underestimation. Here, when the exhaust particles (PM) accumulated (captured) in the collector 40 are completely burned, the accumulation amount of the PM in the collector 40 is reduced enough such that the accumulation amount is considered to be zero in practical use. Thus, this reduced amount may correspond to 10% of the predetermined value, which is used for determination whether the regular regeneration is needed or not at step S108.

Second Embodiment

A second embodiment of the present invention will be described with accompanying drawings. FIG. 10 is a flow chart showing a regeneration control process of the collector 40 executed by the ECU 70 in an exhaust gas purifying apparatus according to the second embodiment of the present invention. Similar or equal elements of the second embodiment, which are similar or equal to the elements in the first embodiment will be indicated with the same numerals, and explanation thereof will be omitted.

In the above first embodiment, it is determined that the part of the surface of the partition wall 400 is exposed when the accumulation amount of the PM is equal to or less than the predetermined value K1 during the process where the accumulation amount ranges from the second accumulation amount at the decrease transition point Z2 to zero at the initial point. However, in the second embodiment, it is determined whether the part of the surface of the partition wall 400 is exposed or not based on an estimated combustion amount of the PM (combustion-reaction amount of the PM) combusted by a reaction with nitrogen oxides (NOx).

Figure 11A:
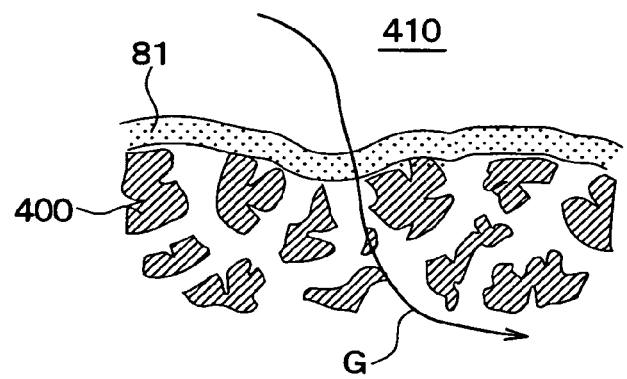
FIG. 11A is a diagram showing a progress of a reaction between a layered exhaust particles and nitrogen oxides.
Figure 11B:
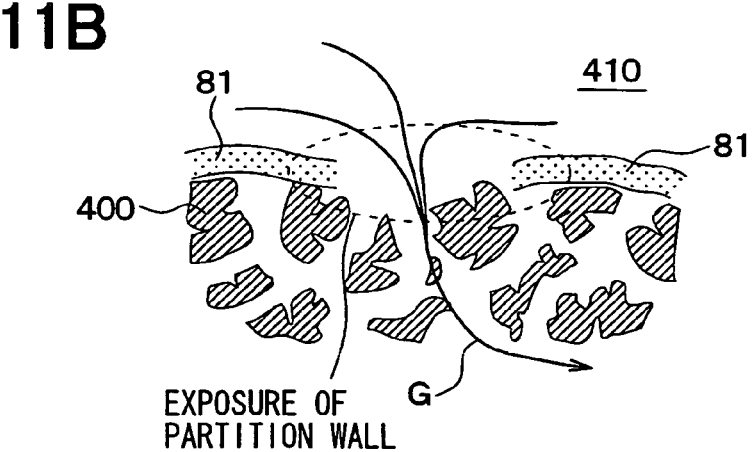
FIG. 11B is a diagram showing another progress of the reaction between the layered exhaust particles and the nitrogen oxides.

FIGS. 11A, 11B shows processes of the reaction between the layered PM 81 and the NOx. When the exhaust gas with a high NOx concentration flows into the partition wall 400 in a state where the laminar PM 81 accumulates (layers) on the surface of the partition wall 400 as shown in FIG. 11A, the PM 81 reacts with the NOx to burn the PM. The PM accumulated at a location, which the exhaust gas with the high NOx concentration passes through, is burned (combusted) particularly. As a result, the part of the surface of the partition wall 400 is exposed as shown in FIG. 11B. When an estimated value of the combustion amount of the PM due to the reaction with the NOx exceeds a predetermined value (predetermined combustion-reaction value), it is determined that the part of the surface of the partition wall 400 is exposed.

A regeneration control process of the collector 40 executed by the ECU 70 will be described. As shown in FIG. 10, at stet S201, which serves as a nitrogen oxides concentration estimating device, a NOx concentration in the exhaust gas is computed. The NOx concentration in the exhaust gas can be computed using a map prestored in the ROM of the ECU 70. Here, the map defines a relation between the rotation speed of the engine 1, the fuel injection quantity, and the NOx concentration. Also, the NOx concentration in the exhaust gas may be sensed using a NOx sensor, which outputs electrical signals based on the NOx concentration in the exhaust gas.

Next, at step S202, the accumulation amount of the PM computed at step S104 or at step S106 and stored in the EEPROM of the ECU 70 is read.

Then, at step S203, the temperature in the collector 40 is computed. The temperature in the collector 40 can be computed, for example, by using an average value of the temperatures sensed by the first and second temperature sensors 62, 63.

Then, at step S204, which serves as a combustion-reaction amount estimating device, the combustion amount of the PM due to the reaction with the NOx is computed.

Figure 12:
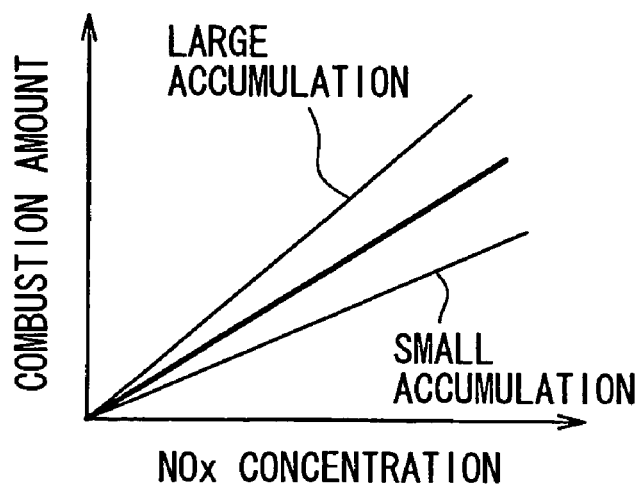
FIG. 12 is a chart showing a relation between a nitrogen oxides concentration, the accumulation amount of the exhaust particles, and a combustion amount of the exhaust particles due to the reaction with the nitrogen oxides.

A computation method for the combustion amount of the PM at step S204 will be described. As shown in FIG. 12, the combustion amount of the PM due to the reaction with the NOx increases as the NOx concentration increases, and as the accumulation amount of the PM increases. The characteristic shown in FIG. 12 is stored as a map in the ROM of the ECU 70.

Figure 13:
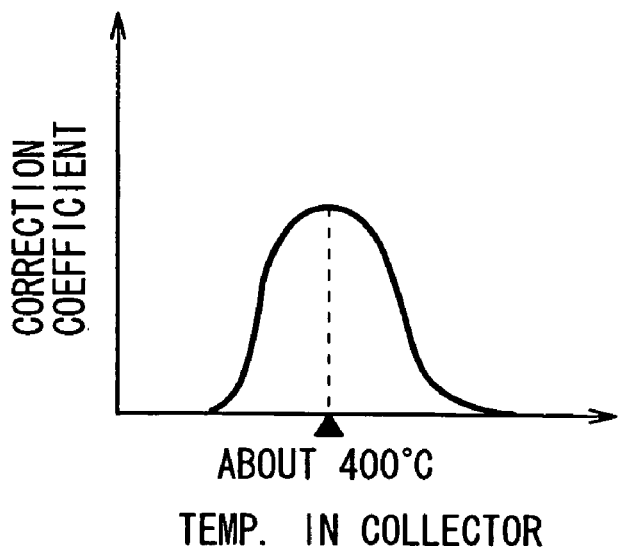
FIG. 13 is a chart showing a relation between a temperature in the collector and a correction coefficient.

When the temperature in the collector 40 is low (e.g., equal to or lower than about 300° C.), the PM are unlikely to react with the NOx. Also, the PM is more likely to react with $NO_2$ than NO. When the temperature in the collector 40 is high (e.g., equal to or higher than about 500° C.), $NO_2$ is converted into NO. Therefore, the PM is most likely to react with the NOx at a temperature of about 400° C. in the collector 40. Thus, the ROM of the ECU 70 prestores a map for defining a correction coefficient, which is maximized when the temperature in the collector 40 is about 400° C. as shown in FIG. 13.

The combustion amount of the PM is computed based on the NOx concentration and the accumulation amount of the PM by using the map, which defines the relation between the combustion amount of the PM due to the reaction, the NOx concentration, and the accumulation amount of the PM. Also, the correction coefficient is computed based on the temperature in the collector 40 by using the map, which defines the relation between the temperature in the collector 40 and the correction coefficient. A corrected (final) combustion amount of the PM is computed by multiplying the computed combustion amount of the PM by the correction coefficient.

After the combustion amount of the PM due to the reaction with the NOx is computed at step S204, it is determined at step S205 (corresponding to the partition wall exposure sensing device) whether the corrected (final) combustion amount of the PM computed at step S204 exceeds a predetermined value or not. When the corrected combustion amount of the PM exceeds the predetermined value (YES at step S205), it is determined that the part of the surface of the partition wall 400 is exposed. Then, the irregular regeneration of the collector 40 is started at step S107.

Other embodiments will be described. In the above first embodiment, it is determined that the part of the surface of the partition wall 400 is exposed when the accumulation amount of the PM is equal to or less than the predetermined value K1 during the process where the accumulation amount ranges from the second accumulation amount at the decrease transition point Z2 to zero at the initial point. However, it may be alternatively determined whether the part of the surface of the partition wall 400 is exposed or not based on a temperature of the exhaust gas downstream of the collector 40.

This will be detailed. In a condition where the engine 1 is operated under a high load operational state, the temperature in the collector 40 is increased and therefore, the PM accumulated in the collector 40 is likely to be combusted. When the operational state of the engine is changed to a low load operational state after the high load operational state, the exhaust gas in the low load operational state travels slowly through the exhaust passage 410, and is simultaneously heated by the combusted PM in the collector 40. Thus, the temperature of the exhaust gas becomes higher as the exhaust gas travels further downstream in the exhaust passage 410. This enhances the combustion of the PM downstream of the exhaust passage 410 such that the part of the surface of the partition wall 400 is exposed. Therefore, the temperature of the exhaust gas that have passed through the collector 40 is likely to be high simultaneously when the part of he surface of the partition wall is exposed.

Thus, the temperature of the exhaust gas that passes through the collector 40 is sensed by the second temperature sensor 63, and when the sensed temperature becomes equal to or higher than a predetermined value (predetermined temperature value), it can be determined that the part of the surface of the partition wall 400 is exposed.

Additional advantages and modifications will readily occur to those skilled in the art. The invention in its broader terms is therefore not limited to the specific details, representative apparatus, and illustrative examples shown and described.

What is claimed is:

1. An exhaust gas purifying apparatus for an internal combustion engine, which includes an exhaust system for exhaust gas from the internal combustion engine, the exhaust gas purifying apparatus comprising:

a collector that is provided in the exhaust system of the internal combustion engine and includes a porous partition wall for capturing exhaust particles in the exhaust gas when the exhaust gas passes through the partition wall;

a regeneration determining device configured to determine that the exhaust particles captured in the collector need to be forcibly combusted to regenerate the collector in a regular manner when an accumulation amount of the exhaust particles captured in the collector exceeds a predetermined value;

a first regenerating device configured to forcibly combust the exhaust particles captured in the collector to regenerate the collector in the regular manner when the regeneration determining device determines that the exhaust particles captured in the collector need to be forcibly combusted;

a differential pressure sensing device configured to sense a differential pressure across the collector;

a differential pressure based estimating device configured to estimate the accumulation amount of the exhaust particles based on the differential pressure across the collector using an accumulation characteristic map that defines a relation between the accumulation amount and the differential pressure;

a second regenerating device configured to forcibly completely combust the exhaust particles captured in the collector; and an operational history based estimating device configured to estimate the accumulation amount of the exhaust particles based on operational state information of the internal combustion engine and a temperature of the collector, when a temperature of the exhaust gas downstream of the collector is equal to or higher than a predetermined temperature value, the second regenerating device forcibly completely combusts the exhaust particles captured in the collector, and the operational history based estimating device estimates the accumulation amount of the exhaust particles.

2. An exhaust gas purifying apparatus for an internal combustion engine, which includes an exhaust system for exhaust gas from the internal combustion engine, the exhaust gas purifying apparatus comprising:

a collector that is provided in the exhaust system of the internal combustion engine and includes a porous partition wall for capturing exhaust particles in the exhaust gas when the exhaust gas passes through the partition wall;

a regeneration determining device configured to determine that the exhaust particles captured in the collector need to be forcibly combusted to regenerate the collector in a regular manner when an accumulation amount of the exhaust particles captured in the collector exceeds a predetermined value;

a first regenerating device configured to forcibly combust the exhaust particles captured in the collector to regenerate the collector in the regular manner when the regeneration determining device determines that the exhaust particles captured in the collector need to be forcibly combusted;

a differential pressure sensing device configured to sense a differential pressure across the collector;

a differential pressure based estimating device configured to estimate the accumulation amount of the exhaust particles based on the differential pressure across the collector using an accumulation characteristic map that defines a relation between the accumulation amount and the differential pressure;

a second regenerating device configured to forcibly completely combust the exhaust particles captured in the collector; and an operational history based estimating device configured to estimate the accumulation amount of the exhaust particles based on operational state information of the internal combustion engine and a temperature of the collector, wherein:

the accumulation characteristic map of the differential pressure based estimating device includes:

an increase characteristic map, which is used when the differential pressure increases as the exhaust particles increases; and a decrease characteristic map, which is used when the differential pressure decreases as the exhaust particles decreases;

the increase characteristic map includes:

a first increase map segment, in which the accumulation amount of the exhaust particles ranges from an initial amount at an initial point to a first accumulation amount at an increase transition point; and a second increase map segment, in which the accumulation amount of the exhaust particles exceeds the first accumulation amount at the increase transition point;

the differential pressure more slowly increases as the accumulation amount of the exhaust particles increases in the second increase map segment than in the first increase map segment;

the decrease characteristic map includes:

a first decrease map segment, in which the accumulation amount of the exhaust particles ranges from a certain amount at a cross point between the first decrease map segment and the second increase map segment to a second accumulation amount at a decrease transition point as the accumulation amount of the exhaust particles decreases; and a second decrease map segment, in which the accumulation amount of the exhaust particles ranges from the second accumulation amount at the decrease transition point to the initial amount at the initial point as the accumulation amount of the exhaust particles decreases;

the differential pressure more slowly decreases as the accumulation amount of the exhaust particles decreases in the second decrease map segment than in the first decrease map segment; and when the accumulation amount of the exhaust particles, which is estimated by the differential pressure based estimating device using the second decrease map segment, is equal to or smaller than a predetermined accumulation value, the second regenerating device forcibly completely combusts the exhaust particles captured in the collector, and the operational history based estimating device estimates the accumulation amount of the exhaust particles.

3. The exhaust gas purifying apparatus according to claim 2, wherein:

the operational history based estimating device is configured to estimate the accumulation amount of the exhaust particles based on a discharge amount of the exhaust particles from the internal combustion engine and a combustion amount of the exhaust particles in the collector.

4. An exhaust gas purifying apparatus for an internal combustion engine, which includes an exhaust system for exhaust gas from the internal combustion engine, the exhaust gas purifying apparatus comprising:

a collector that is provided in the exhaust system of the internal combustion engine and includes a porous partition wall for capturing exhaust particles in the exhaust gas when the exhaust gas passes through the partition wall;

a regeneration determining device configured to determine that the exhaust particles captured in the collector need to be forcibly combusted to regenerate the collector in a regular manner when an accumulation amount of the exhaust particles captured in the collector exceeds a predetermined value;

a first regenerating device configured to forcibly combust the exhaust particles captured in the collector to regenerate the collector in the regular manner when the regeneration determining device determines that the exhaust particles captured in the collector need to be forcibly combusted;

a differential pressure sensing device configured to sense a differential pressure across the collector;

a differential pressure based estimating device configured to estimate the accumulation amount of the exhaust particles based on the differential pressure across the collector using an accumulation characteristic map that defines a relation between the accumulation amount and the differential pressure;

a second regenerating device configured to forcibly completely combust the exhaust particles captured in the collector;

an operational history based estimating device configured to estimate the accumulation amount of the exhaust particles based on operational state information of the internal combustion engine and a temperature of the collector;

a nitrogen oxides concentration estimating device configured to estimate a nitrogen oxides concentration in the exhaust gas; and a combustion-reaction amount estimating device configured to estimate a combustion-reaction amount of the exhaust particles due to a reaction with nitrogen oxides, wherein:

when the combustion-reaction amount estimated by the combustion-reaction amount estimating device is equal to or larger than a predetermined combustion-reaction value, the second regenerating device forcibly completely combusts the exhaust particles captured in the collector, and the operational history based estimating device estimates the accumulation amount of the exhaust particles.

5. The exhaust gas purifying apparatus according to claim 4, wherein:
the combustion-reaction amount estimating device is configured to estimate the combustion-reaction amount due to the reaction with the nitrogen oxides based on the nitrogen oxides concentration, the accumulation amount of the exhaust particles, and a temperature in the collector.

6. The exhaust gas purifying apparatus according to claim 5, wherein:
the combustion-reaction amount estimating device is configured such that the combustion-reaction amount of the exhaust particles, which is estimated by the combustion-reaction amount estimating device is increased when the nitrogen oxides concentration is increased.

7. The exhaust gas purifying apparatus according to claim 5, wherein:
the combustion-reaction amount estimating device is configured such that the combustion-reaction amount of the exhaust particles, which is estimated by the combustion-reaction amount estimating device, is increased when the accumulation amount of the exhaust particles is increased.

* * * * *